(12) United States Patent
Dern et al.

(10) Patent No.: US 8,916,630 B2
(45) Date of Patent: Dec. 23, 2014

(54) POLYCARBONATE COMPRISING GLASS FIBRES

(71) Applicant: Bayer Intellectual Property GmbH, Monheim (DE)

(72) Inventors: Gesa Dern, Dusseldorf (DE); Birte Sämisch, Köln (DE); Tanja Cassel, Oberhausen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 14/346,991

(22) PCT Filed: Sep. 27, 2012

(86) PCT No.: PCT/EP2012/069087
§ 371 (c)(1),
(2), (4) Date: Mar. 25, 2014

(87) PCT Pub. No.: WO2013/045552
PCT Pub. Date: Apr. 4, 2013

(65) Prior Publication Data
US 2014/0243467 A1  Aug. 28, 2014

(30) Foreign Application Priority Data
Sep. 28, 2011  (EP) .................................. 11183072

(51) Int. Cl.
*C08L 69/00*    (2006.01)
*C08L 53/00*    (2006.01)

(52) U.S. Cl.
CPC ..................................... C08L 69/00 (2013.01)
USPC ......................................... 524/69; 525/92 D (58) Field of Classification Search
CPC .................................. C08L 69/00; C08L 53/00
USPC ......................................... 524/508; 525/92 D
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,654,575 A | 4/1972 | Cluwen |
| 3,879,348 A | 4/1975 | Serini et al. |
| 4,420,584 A * | 12/1983 | Rawlings et al. ............. 524/502 |
| 4,982,014 A | 1/1991 | Freitag et al. |
| 5,202,374 A | 4/1993 | Horn et al. |
| 5,728,765 A | 3/1998 | Chung et al. |
| 5,844,028 A | 12/1998 | Paulik |
| 6,093,759 A | 7/2000 | Gareiss et al. |
| 2006/0094813 A1 | 5/2006 | Warth et al. |

FOREIGN PATENT DOCUMENTS

| | | |
|---|---|---|
| DE | 1570703 A1 | 2/1970 |
| DE | 1961668 A1 | 6/1970 |
| DE | 2036052 A1 | 1/1972 |
| DE | 2 063 050 A1 | 7/1972 |
| DE | 2211956 A1 | 10/1973 |
| DE | 3832396 A1 | 2/1990 |
| DE | 10257079 A1 | 6/2004 |
| EP | 0063769 A2 | 11/1982 |
| EP | 0472064 A2 | 2/1992 |
| EP | 0728811 A2 | 8/1996 |
| EP | 1188792 A1 | 3/2002 |
| EP | 1342753 A1 | 9/2003 |
| FR | 1561518 A | 3/1969 |
| GB | 1122003 A | 7/1968 |
| GB | 1229482 A | 4/1971 |
| GB | 1367790 A | 9/1974 |
| JP | 1986-062039 | 3/1986 |
| JP | 1986-062040 | 3/1986 |
| JP | 1986-105550 | 5/1986 |
| JP | 3212468 B2 | 9/2001 |
| JP | 3474251 B2 | 12/2003 |
| WO | WO-97/40092 A1 | 10/1997 |
| WO | WO-2006/040087 A1 | 4/2006 |

* cited by examiner

*Primary Examiner* — Kelechi Egwim
(74) *Attorney, Agent, or Firm* — Drinker Biddle & Reath LLP (57) ABSTRACT

The present invention relates to a thermoplastic molding composition composed of polycarbonate and inorganic fillers which comprises from 0.01 to 0.5 part by weight of at least one anhydride-modified alpha-olefin terpolymer and which has a high degree of rigidity and nevertheless exhibits good strength, as well as stress-strain characteristics corresponding to those of an unreinforced polycarbonate. Surprisingly, the molding composition additionally exhibits an improvement in flame retardancy. The invention relates in particular to flame-retardant, thermoplastic molding compositions filled with glass fibers, and to the production and use thereof. The property profile is, surprisingly, independent of the degree of interaction of the filler with the polycarbonate matrix.

14 Claims, 2 Drawing Sheets

POLYCARBONATE COMPRISING GLASS FIBRES

RELATED APPLICATIONS

This application is a national stage application (under 35 U.S.C. §371) of PCT/EP2012/069087, filed Sep. 27, 2012, which claims benefit of European Application No. 11183072.5, filed Sep. 28, 2011, which is incorporated by reference herein.

The present invention relates to a thermoplastic moulding composition composed of polycarbonate and inorganic fillers which has a high degree of rigidity and nevertheless exhibits good strength, as well as stress-strain characteristics corresponding to those of an unreinforced polycarbonate. Surprisingly, the moulding composition additionally exhibits an improvement in flame retardancy.

The invention relates in particular to flame-retardant, thermoplastic moulding compositions filled with glass fibres, and to the production and use thereof. The property profile is, surprisingly, independent of the degree of interaction of the glass fibres with the polycarbonate matrix.

These moulding compositions are suitable in particular for casing parts which require high rigidity and dimensional stability and must additionally exhibit high toughness against impacts, such as, for example, casings in the electronics field (printers, switch boxes, loudspeakers, etc.) as well as casings for mobile electronics (cameras, mobile telephones, etc.). Moreover, the moulding compositions are also suitable for protective equipment, such as protective helmets or impact-resistant, shatter-proof sheets.

From JP3212468 there are known on the one hand non-flame-retardant polycarbonate compositions composed of 45-97 wt. % of an aromatic polycarbonate resin comprising 3-55 wt. % of an inorganic filler (glass flakes, metal flakes, mica or talc) and 0.02-3 wt. % of an olefinic wax comprising carboxylic groups or derivatives thereof. On the other hand there are described compositions that comprise 7-96 wt. % of an aromatic polycarbonate resin and 1-90 wt. % of an olefinic graft polymer comprising 3-55 wt. % of an inorganic filler (glass flakes, metal flakes, mica or talc) and 0.02-3 wt. % of the above-mentioned olefinic wax.

In JP 3474251 there are described non-flame-retardant thermoplastic compositions which, as well as comprising an aromatic polycarbonate resin and a graft-modified olefin rubber, comprise a polyorganosiloxane rubber, a reinforcing fibre and one or more olefinic waxes and/or olefinic polymers having carboxylic or carboxylic acid anhydride groups. The composition exhibits high dimensional stability as well as good mechanical properties, such as an increase in impact strength.

U.S. Pat. No. 5,728,765 describes an impact-resistant polycarbonate composition comprising up to 40% of a glass fibre type which exhibits a non-interacting property with the polymer matrix and to which 0.5-4% silicone rubber powder has been added.

Accordingly, the object of the present invention was to provide polycarbonate compounds having a combination of good strength as well as stress-strain characteristics and improved flame retardancy, which compounds do not exhibit the disadvantages of the compositions known from the prior art, in particular not the usual loss of the strength brought about by the addition of glass fibres, or the loss of flame retardancy upon addition of necessary large amounts of an impact modifier.

Surprisingly, it has now been found that the above-mentioned properties are obtained if a rubber-free anhydride-modified alpha-olefin terpolymer is used in filled, flame-retardant polycarbonate compositions.

The moulding compositions so composed are distinguished by improved mechanical properties, such as good strength, in conjunction with good stress-strain characteristics and improved flame resistance.

The invention provides flame-resistant, thermoplastic moulding compositions comprising
A) from 47.500 to 97.939 parts by weight, preferably from 60.0 to 95.0 parts by weight, particularly preferably from 74.0 to 86.0 parts by weight, of at least one aromatic polycarbonate,
B) from 0.001 to 1.000 part by weight, preferably from 0.050 to 0.800 part by weight, more preferably from 0.100 to 0.600 part by weight, particularly preferably from 0.100 to 0.300 part by weight, of at least one flame retardant,
C) from 0.01 to 0.50 part by weight, preferably from 0.05 to 0.50 part by weight, more preferably from 0.10 to 0.50 part by weight, yet more preferably from 0.10 to 0.40 part by weight, particularly preferably from 0.10 to 0.30 part by weight, most particularly preferably from 0.20 to 0.30 part by weight, of at least one rubber-free anhydride-modified alpha-olefin terpolymer,
D) from 2.0 to 40.0 parts by weight, preferably from 3.0 to 30.0 parts by weight, more preferably from 5.0 to 20.0 parts by weight, and particularly preferably from 7.0 to 14.0 parts by weight, of at least one inorganic filler,
E) from 0.05 to 1.00 part by weight, more preferably from 0.10 part by weight to 0.75 part by weight, particularly preferably from 0.15 part by weight to 0.60 part by weight, and most particularly preferably from 0.20 part by weight to 0.50 part by weight, of at least one demoulding agent,
F) from 0 to 10.0 parts by weight, preferably from 0.5 to 8.0 parts by weight, particularly preferably from 1.0 to 6.0 parts by weight, of further conventional additives,
wherein the sum of the parts by weight of components A) to F) is 100 parts by weight.

In a preferred embodiment the composition consists only of components A)-E), in a further preferred embodiment of components A)-F).

Preferred embodiments and individual compounds/ingredients of components A-F can be used both individually and in combination with one another. The same applies to the combination of the above-mentioned details regarding parts by weight of different components, which can freely be combined.

In an alternative embodiment comprising spherical fillers, the amount of component C) is preferably from 0.1 to 1.5 parts by weight, more preferably from 0.5 to 1.0 part by weight.

BRIEF DESCRIPTION OF THE DRAWINGS

FIG. 4 SEM image showing non-binding characteristics.
Component A
Polycarbonates within the meaning of the present invention are both homopolycarbonates and copolycarbonates; the polycarbonates can in a known manner be linear or branched.
The preparation of the polycarbonates is carried out in a known manner from diphenols, carbonic acid derivatives, optionally chain terminators and branching agents.

Details of the preparation of polycarbonates have been laid down in many patent specifications for about 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to Dres. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Diphenols suitable for the preparation of the polycarbonates are, for example, hydroquinone, resorcinol, dihydroxydiphenyls, bis-(hydroxyphenyl)-alkanes, bis(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, alpha-alpha'-bis-(hydroxyphenyl)-diisopropylbenzenes, phthalimidines derived from isatin or phenolphthalein derivatives and compounds thereof alkylated, arylated and halogenated on the ring.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and further suitable diphenols are described, for example, in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of the homopolycarbonates only one diphenol is used; in the case of the copolycarbonates a plurality of diphenols is used.

Suitable carbonic acid derivatives are, for example, phosgene or diphenyl carbonate.

Suitable chain terminators which can be used in the preparation of the polycarbonates are both monophenols and monocarboxylic acids. Suitable monophenols are, for example, phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol, and mixtures thereof.

Preferred chain terminators are also phenols which are substituted one or more times by C1 to C30-alkyl radicals, linear or branched, preferably unsubstituted or substituted by tert-butyl. Particularly preferred chain terminators are phenol, cumylphenol and/or p-tert-butylphenol.

Suitable monocarboxylic acids are also benzoic acid, alkylbenzoic acids and halobenzoic acids.

The amount of chain terminator to be used is preferably from 0.1 to 5 mol %, based on moles of diphenols used in a particular case. The addition of the chain terminators can take place before, during or after the reaction with a carbonic acid derivative.

Suitable branching agents are the compounds known in polycarbonate chemistry having a functionality of three or more than three, in particular those having three or more than three phenolic OH groups.

Suitable branching agents are, for example, phloroglucinol, 4,6-dimethyl-2,4,6-tri-(4-hydroxyphenyl)-heptene-2,4, 6-dimethyl-2,4,6-tri(4-hydroxyphenyl)-heptane, 1,3,5-tri(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of chain terminators that are optionally to be used is preferably from 0.05 mol % to 2.00 mol %, again based on moles of diphenols used in a particular case.

The branching agents can either be placed in a reaction vessel with the diphenols and the chain terminators in the aqueous alkaline phase, or they can be added, in solution in an organic solvent, prior to the phosgenation. In the case of the transesterification process, the branching agents are used together with the diphenols.

The aromatic polycarbonates of the present invention have weight-average molecular weights Mw (determined by gel permeation chromatography and calibration with polycarbonate standard) of from 5000 to 200,000 g/mol, preferably from 18,000 to 36,000 g/mol, more preferably from 22,000 to 34,000 g/mol, yet more preferably from 24,000 to 32,000 g/mol, and particularly preferably from 26,000 to 32,000 g/mol.

Particularly preferred polycarbonates are the homopolycarbonate based on bisphenol A, the homopolycarbonate based on 1,3-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

Component B

Suitable flame retardants within the meaning of the present invention are inter alia alkali and alkaline earth salts of aliphatic and aromatic sulfonic acid, sulfonamide and sulfonimide derivatives, for example potassium perfluorobutanesulfonate, potassium diphenyl-sulfonesulfonate, N-(p-tolylsulfonyl)-p-toluenesulfimide potassium salt, N—(N'-benzylaminocarbonyl)-sulfanylimide potassium salt.

Salts which can optionally be used in the moulding compositions according to the invention are, for example: sodium or potassium perfluorobutane sulfate, sodium or potassium perfluoromethanesulfonate, sodium or potassium perfluorooctane sulfate, sodium or potassium 2,5-dichlorobenzene sulfate, sodium or potassium 2,4,5-trichlorobenzene sulfate, sodium or potassium methylphosphonate, sodium or potassium (2-phenyl-ethylene)-phosphonate, sodium or potassium pentachlorobenzoate, sodium or potassium 2,4,6-trichlorobenzoate, sodium or potassium 2,4-dichlorobenzoate, lithium phenylphosphonate, sodium or potassium diphenylsulfonesulfonate, sodium or potassium 2-formylbenzenesulfonate, sodium or potassium (N-benzenesulfonyl)-benzenesulfonamide, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-(p-tolylsulfonyl)-p-toluenesulfimide potassium salt, N—(N'-benzylaminocarbonyl)-sulfanylimide potassium salt.

Preference is given to sodium or potassium perfluorobutane sulfate, sodium or potassium perfluorooctane sulfate, sodium or potassium diphenylsulfonesulfonate and sodium or potassium 2,4,6-trichlorobenzoate and N-(p-tolylsulfonyl)-p-toluenesulfimide potassium salt, N—(N'-benzylaminocarbonyl)-sulfanylimide potassium salt. Most particular preference is given to potassium nona-fluoro-1-butanesulfonate and sodium or potassium diphenylsulfonesulfonate. Potassium nona-fluoro-1-butanesulfonate is available commercially inter alia as Bayowet®C4 (Lanxess, Leverkusen, Germany, CAS No. 29420-49-3), RM64 (Miteni, Italy) or as 3M™ Perfluorobutanesulfonyl Fluoride FC-51 (3M, USA). Mixtures of the mentioned salts are likewise suitable.

There are suitable as additional flame retardants, for example, phosphorus-containing flame retardants selected from the groups of the monomeric and oligomeric phosphoric and phosphonic acid esters, phosphonate amines, phosphonates, phosphinates, phosphites, hypophosphites, phosphine oxides and phosphazenes, whereby mixtures of a plurality of components selected from one or various of those groups may also be used as flame retardants. It is also possible to use other, preferably halogen-free phosphorus compounds not mentioned specifically here, alone or in arbitrary combination with other, preferably halogen-free phosphorus compounds. These include also purely inorganic phosphorus compounds such as boron phosphate hydrate. Phosphonate amines further come into consideration as phosphorus-containing flame retardants. The preparation of phosphonate amines is described, for example, in U.S. Pat. No. 5,844,028. Phosphazenes and their preparation are described, for example, in EP A 728 811, DE A 1 961668 and WO 97/40092. Siloxanes, phosphorylated organosiloxanes, silicones or siloxysilanes can also be used as flame retardants, which is described in greater detail, for example, in EP 1 342 753, in DE 10257079A and in EP 1 188 792.

It is further possible to use as an additional flame retardant bisphenol A diphosphate, which is available commercially inter alia as Reofos® BAPP (Chemtura, Ind., USA), NcendX® P-30 (Albemarle, Baton Rouge, La., USA), Fyrolflex® BDP (Akzo Nobel, Arnheim, Netherlands) or CR 741® (Daihachi, Osaka, Japan).

Further phosphoric acid esters which can be used within the context of the present invention as additional flame retardants are additionally triphenyl phosphate, which is supplied inter alia as Reofos® TPP (Chemtura), Fyrolflex® TPP (Akzo Nobel) or Disflamoll® TP (Lanxess), and resorcinol diphosphate. Resorcoinol diphosphate can be obtained commercially as Reofos RDP (Chemtura) or Fyrolflex® RDP (Akzo Nobel).

Within the context of the present invention the phosphorus compounds can preferably additionally optionally be used in amounts of from 1 wt. % to 30 wt. %, preferably from 1 wt. % to 18 wt. %, particularly preferably from 2 wt. % to 15 wt. %, in particular from 4 to 14 wt. %, and most particularly preferably from 6 to 14 wt. %, in each case based on the total composition.

Further suitable additional flame retardants within the meaning of the present invention are halogen-containing compounds. These include brominated compounds such as brominated oligocarbonates (e.g. tetrabromobisphenol A oligocarbonate BC-52®, BC-58®, BC-52HP® from Chemtura), polypentabromobenzyl acrylates (e.g. FR 1025 from Dead Sea Bromine (DSB)), oligomeric reaction products of tetrabromobisphenol A with epoxides (e.g. FR 2300 and 2400 from DSB), or brominated oligo- and poly-styrenes (e.g. Pyro-Chek® 68PB from Ferro Corporation, PDBS 80 and Firemaster® PBS-64HW from Chemtura).

Within the context of the present invention additional bromine-containing compounds can optionally be used in amounts of from 0.01 wt. % to 30 wt. %, preferably from 0.1 wt. % to 30 wt. %, particularly preferably from 0.1 wt. % to 25 wt. %, and most particularly preferably from 0.5 wt. % to 5 wt. %, in each case based on the total composition.

Polytetrafluoroethylene (PTFE) can additionally be added to the moulding compositions as an antidripping agent. PTFE is available commercially in various product grades. These include additives such as Hostaflon® TF2021 or alternatively PTFE blends such as Metablen® A-3800 (about 40% PTFE CAS 9002-84-0 and about 60% methyl methacrylate/butyl acrylate copolymer CAS 25852-37-3 from Misubishi-Rayon) or Blendex® B449 (about 50% PTFE and about 50% SAN [composed of 80% styrene and 20% acrylonitrile] from Chemtura.

Within the context of the present invention PTFE can optionally be used in amounts of from 0.05 wt. % to 5 wt. %, preferably from 0.1 wt. % to 1.0 wt. %, particularly preferably from 0.1 wt. % to 0.5 wt. %, in each case based on the total composition.

Component C

Component C within the meaning of the present invention is a rubber-free anhydride-modified alpha-olefin terpolymer, wherein the anhydride is an unsaturated carboxylic acid anhydride.

The anhydride is preferably selected from the group comprising maleic anhydride, phthalic anhydride, fumaric anhydride and itaconic anhydride and mixtures thereof.

The anhydride is particularly preferably maleic anhydride.

The alpha-olefin terpolymer preferably comprises structural units selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene, and mixtures thereof.

The terpolymer particularly preferably comprises ethylene, 1-propene and 1-octene as structural units.

The rubber-free anhydride-modified terpolymer is characterised in that the composition comprises C1) from 90.0 to 98.0 wt. %, preferably from 92.0 to 97.5 wt. %, particularly preferably from 94.0 to 97.0 wt. %, terpolymer and C2) from 2.0 to 10.0 wt. %, preferably from 2.5 to 8.0 wt. %, and particularly preferably from 3.0 to 6.0 wt. %, anhydride.

The rubber-free anhydride-modified terpolymer preferably has a molecular weight Mw of from 2000 to 10,000 g/mol, preferably from 2500 to 8000 g/mol, particularly preferably from 3000 to 6000 g/mol, determined by GPC (gel permeation chromatography) in trichlorobenzene as solvent with polystyrene as standard.

The olefinic portion C1) of the anhydride-modified terpolymer is preferably characterised in that the ethylene content is from 96.0 to 80.0 wt. %, more preferably from 92.0 to 84.0 wt. %; the propylene content is from 2.0 to 10.0 wt. %, more preferably from 4.0 to 8.0 wt. %; and the octene content is from 2.0 to 10.0 wt. %, more preferably from 4.0 to 8.0 wt. %.

Component D

Fillers within the meaning of the present invention are, for example, glass spheres, hollow glass spheres, glass flakes, carbon blacks, graphite, carbon nanotubes, quartz, talc, mica, silicates, nitrides, in particular boron nitride, wollastonite, as well as fumed or precipitated silicas, the silicas having BET surface areas of at least 50 m²/g (according to DIN 66131/2).

There are preferably used fibrous fillers, such as metal fibres, carbon fibres, plastics fibres, glass fibres or ground glass fibres, and particularly preferably glass fibres or ground glass fibres.

Glass fibres are preferably used in the form of rovings, long glass fibres and chopped glass fibres, which are prepared from M-, E-, A-, S-, R- or C-glass, with E-, A- or C-glass being further preferred.

The diameter of the fibres is preferably from 5 to 25 µm, more preferably from 6 to 20 µm, particularly preferably from 7 to 15 µm.

Long glass fibres preferably have a length of from 5 to 50 mm, more preferably from 5 to 30 mm, yet more preferably from 6 to 15 mm, and particularly preferably from 7 to 12 mm; they are described, for example, in WO-A 2006/040087.

In the case of chopped glass fibres, preferably at least 70 wt. % of the glass fibres have a length of more than 60 µm.

The values mentioned above preferably also apply to other fibres, apart from glass fibres, used according to the invention.

The fibres used, in particular the glass fibres, are distinguished in that the choice of fibres is not limited by the interaction characteristics of the fibres with the polycarbonate matrix, whereas in U.S. Pat. No. 5,728,765 only glass fibres that do not interact with the polymer matrix are described.

Both for strong binding to the polymer matrix and in the case of a non-binding fibre, an improvement in the properties according to the invention of the compositions is shown.

Figure 1:
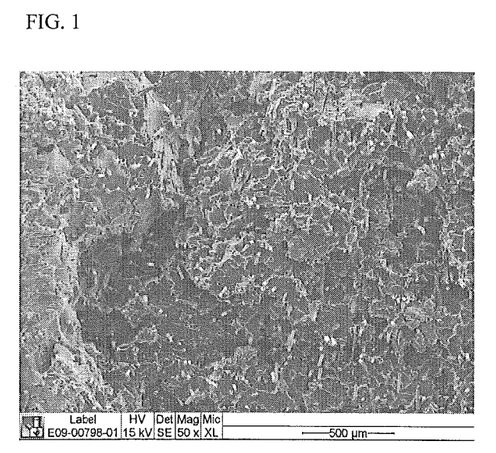
FIG. 1 Scanning electron microscope (SEM) image showing strong binding of the glass fibres to the polymer matrix.
Figure 2:
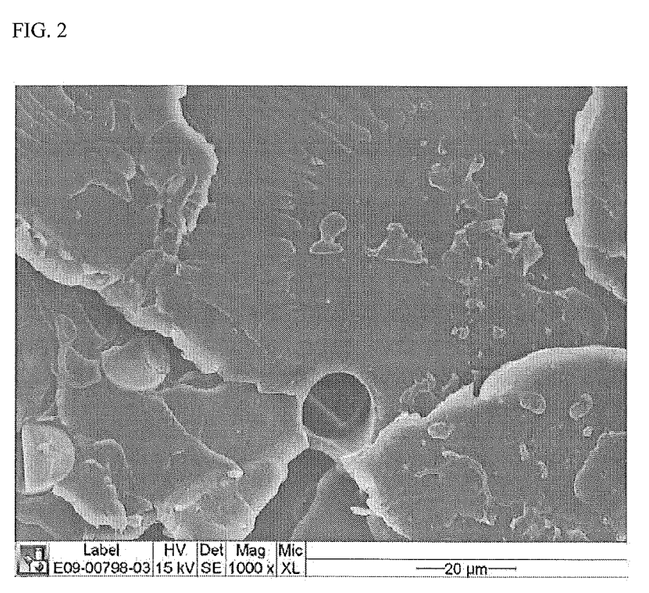
FIG. 2 SEM image showing strong binding of the glass fibres to the polymer matrix.
Figure 3:
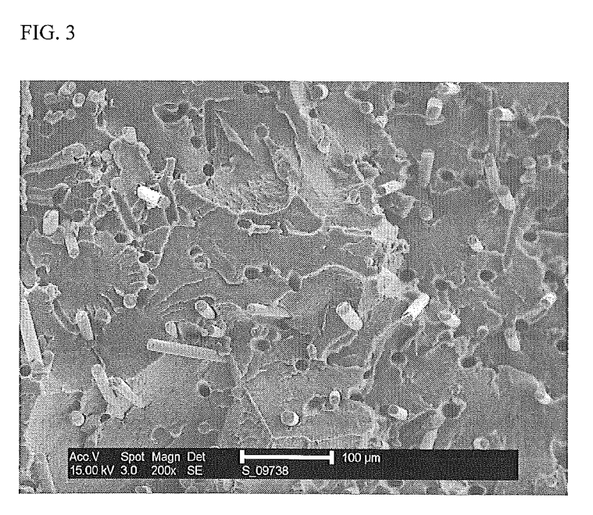
FIG. 3 SEM image showing non-binding characteristics.
Figure 4:
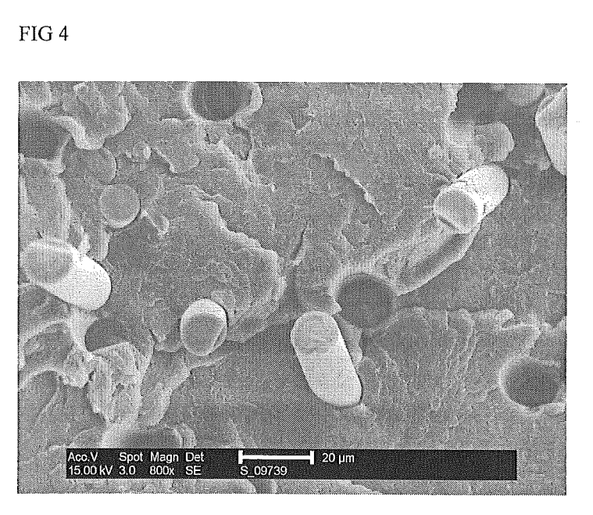

Strong binding of the glass fibres to the polymer matrix is to be seen in the low-temperature fracture surfaces of the scanning electron microscope images (FIGS. 1 and 2): It can be seen that the largest number of broken glass fibres are broken at the same height as the matrix and only occasional glass fibres protrude from the matrix. The scanning electron microscope images (FIGS. 3 and 4) show the reverse case of non-binding characteristics, that the glass fibres in the low-temperature fracture protrude considerably from the matrix or have slipped out completely.

In an alternative embodiment, the inorganic filler is a filler having a spherical particle shape. There are suitable as inorganic fillers in particular minerals that are composed of more than 97 wt. % quartz ($SiO_2$). The particle shape is thereby spherical and/or approximately spherical.

In a preferred embodiment, the spherical fillers are finely divided quartz flours which have been prepared from purified quartz sand by iron-free grinding with subsequent air separation.

These quartz-based materials are also called silicates hereinbelow.

The silicates used in the invention are characterised by a mean diameter d50% of from 2 to 10 µm, preferably from 2.5 to 8.0 µm, more preferably from 3 to 5 µm, and particularly preferably of 3 µm.

The upper diameter $d_{95\%}$ is preferably from 6 to 34 µm, more preferably from 6.5 to 25.0 µm, yet more preferably from 7 to 15 µm, and particularly preferably 10 µm.

The particle size distribution (mean diameter) is determined by air separation.

The silicates preferably have a specific BET surface area, determined by nitrogen adsorption according to ISO 9277, of from 0.4 to 8.0 m²/g, more preferably from 2 to 6 m²/g, and particularly preferably from 4.4 to 5.0 m²/g.

Further preferred silicates comprise a maximum of only 3 wt. % secondary constituents, whereby preferably the content of
$Al_2O_3$<2.0 wt. %,
$Fe_2O_3$<0.05 wt. %,
$(CaO+MgO)$<0.1 wt. %,
$(Na_2O+K_2O)$<0.1 wt. %, in each case based on the total weight of the silicate.

There are preferably used silicates having a pH value, measured according to ISO 10390 in aqueous suspension, in the range from 6 to 9, more preferably from 6.5 to 8.0.

They additionally have an oil absorption value according to ISO 787-5 of preferably from 20 to 30 g/100 g.

In a preferred embodiment there are used inorganic fillers, in particular silicates, that have a coating comprising organosilicon compounds, wherein epoxysilane, methylsiloxane and methacryl silane sizes are preferably used. An epoxysilane size is particularly preferred.

The sizing of inorganic fillers is carried out by the general processes known to the person skilled in the art.

Component E

The demoulding agents E) that are optionally used are esters of aliphatic long-chain carboxylic acids with mono- or poly-valent aliphatic and/or aromatic hydroxy compounds. Aliphatic carboxylic acid esters that are particularly preferably used are compounds of the general formula (III):

$(R_4-CO-O)_o-R_5-(OH)_p$ wherein $o$=from 1 to 4 and $p$=from 3 to 0     (III)

wherein R4 is an aliphatic saturated or unsaturated, linear, cyclic or branched alkyl radical and R5 is an alkylene radical of a 1- to 4-hydric aliphatic alcohol R5-(OH)o+p.

C1-C18-Alkyl radicals are particularly preferred for R4. C1-C18-Alkyl represents, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-l-methylpropyl or 1-ethyl-2-methylpropyl, n-heptyl and n-octyl, pinacyl, adamantyl, the isomeric menthyls, n-nonyl, n-decyl, n-dodecyl, n-tridecyl, n-tetradecyl, n-hexadecyl or n-octadecyl.

Alkylene represents a straight-chain, cyclic, branched or unbranched C1-C18-alkylene radical. C1-C18-Alkylene represents, for example, methylene, ethylene, n-propylene, isopropylene, n-butylene, n-pentylene, n-hexylene, n-heptylene, n-octylene, n-nonylene, n-decylene, n-dodecylene, n-tridecylene, n-tetradecylene, n-hexadecylene or n-octadecylene.

In the case of esters of polyhydric alcohols, free, unesterified OH groups can also be present. Aliphatic carboxylic acid esters that are suitable according to the invention are, for example: glycerol monostearate, palmityl palmitate and stearyl stearate. Mixtures of different carboxylic acid esters of formula (III) can also be used. Carboxylic acid esters that are preferably used are esters of pentaerythritol, glycerol, trimethylolpropane, propanediol, stearyl alcohol, cetyl alcohol or myristyl alcohol with myristic, palmitic, stearic or montanic acid, and mixtures thereof. Particular preference is given to pentaerythritol tetrastearate, glycerol monostearate, stearyl stearate and propanediol distearate, and mixtures thereof, and most particular preference is given to stearyl stearate.

Specific UV stabilisers that have as low a transmission as possible below 400 nm and as high a transmission as possible above 400 nm can optionally be added to the compositions as a further additive (F). Ultraviolet absorbers that are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxy-phenyl)-benzotriazole (Tinuvin® 234, Ciba Spezialitätenchemie, Basel), 2-(2'-hydroxy-5'-(tert-octyl)-phenyl)-benzotriazole (Tinuvin® 329, Ciba Spezialitätenchemie, Basel), 2-(2'-hydroxy-3'-(2-butyl)-5'-(tert-butyl)-phenyl)-benzotriazole (Tinuvin® 350, Ciba Spezialitätenchemie, Basel), bis-(3-(2H-benztriazolyl)-2-hydroxy-5-tert-octyl)methane, (Tinuvin® 360, Ciba Spezialitätenchemie, Basel), (2-(4,6-diphenyl-1,3,5-triazin-2-yl)-5-(hexyloxy)-phenol (Tinuvin® 1577, Ciba Spezialitätenchemie, Basel), as well as the benzophenones 2,4-dihydroxy-benzophenone (Chimasorb® 22, Ciba Spezialitätenchemie, Basel) and 2-hydroxy-4-(octyloxy)-benzophenone (Chimassorb® 81, Ciba, Basel), 2-propenoic acid, 2-cyano-3,3-diphenyl-, 2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetra-ethyl-2,2'-(1,4-phenylene-dimethylidene)-bismalonate (Hostavin® B-Cap, Clariant AG).

Particularly preferred specific UV stabilisers are, for example, Tinuvin® 360, Tinuvin® 350, Tinuvin® 329, Hostavin® B-CAP, particularly preferably TIN 329 and Hostavin® B-Cap.

Mixtures of these ultraviolet absorbers can also be used.

According to a specific embodiment of the invention the composition comprises ultraviolet absorber in an amount of from 0 ppm to 6000 ppm, preferably from 500 ppm to 5000 ppm, and more preferably from 1000 ppm to 2000 ppm, based on the total composition.

The polymer compositions according to the invention can optionally comprise, in addition to the stabilisers according to the invention, also further conventional polymer additives as component F), such as, for example, the antioxidants, heat stabilisers, flame retardants other than B), optical brightening agents and light-scattering agents described in EP-A 0 839 623, WO-A 96/15102, EP-A 0 500 496 or "Plastics Additives Handbook", Hans Zweifel, 5th Edition 2000, Hanser Verlag, Munich), in the amounts conventional for the particular thermoplastics in question.

The preparation of the polymer compositions according to the invention comprising components A) to F) is carried out by conventional methods of incorporation by combining, mixing and homogenising the individual constituents, wherein the homogenisation in particular is preferably carried out in the melt under the action of shear forces. The constituents are optionally combined and mixed prior to the melt homogenisation, using powder premixtures.

It is also possible to use premixtures of granulates or granulates and powders with the additives according to the invention.

It is also possible to use premixtures which have been prepared from solutions of the components in suitable solvents, homogenisation optionally being carried out in solution and the solvent subsequently being removed.

In particular, the additives can hereby be introduced into the composition according to the invention by known processes or in the form of a masterbatch.

The use of masterbatches is preferred in particular for the introduction of the additives, masterbatches based on the polymer matrix in question being used in particular.

In this connection, the composition can be combined, mixed, homogenised and then extruded in conventional devices such as screw extruders (for example twin screw extruder, ZSK), kneaders, Brabender or Banbury mills. After the extrusion, the extrudate can be cooled and comminuted. Individual components can also be premixed and the remaining starting materials can then be added individually and/or likewise in the form of a mixture.

The combining and thorough mixing of a premixture in the melt can also take place in the plasticising unit of an injection moulding machine. The melt is hereby converted directly into a moulded article in the subsequent step.

The production of the plastics mouldings can then take place preferably by injection moulding.

The use of the plastics composition according to the invention in the production of multilayer systems is also of interest. The plastics composition according to the invention is hereby applied in one or more layers to a shaped article of a plastics material. The application can take place at the same time as or immediately after the shaping of the moulded article, for example by the back injection moulding of a film, coextrusion or multicomponent injection moulding. Application can, however, also be made to the finished shaped base article, for example by lamination with a film, injection moulding around an existing moulded article, or by coating from a solution.

The present invention relates further to the use of rubber-free anhydride-modified alpha-olefin terpolymers according to component C) for increasing the flowability of polycarbonate compositions, as well as to the compositions themselves, wherein the compositions further have good mechanical properties.

The polycarbonate compositions can optionally comprise flame retardants according to component B and/or fillers according to component D.

In a preferred embodiment the polycarbonate compositions can further comprise further demoulding agents and conventional additives of components E and F.

The compositions with improved melt flowability preferably correspond to the compositions described above but with a higher content of component C, the amount of component A being correspondingly decreased.

For the compositions with improved flowability the amount of component C is preferably from 0.5 to 10.0 parts by weight, more preferably from 1.0 to 9.0 parts by weight, yet more preferably from 1.5 to 8.0 parts by weight, even more preferably from 1.75 to 6 parts by weight, and particularly preferably from 2.0 to 5.0 parts by weight.

In an alternative embodiment the present invention relates also to the above-mentioned use of the terpolymers for improving the flowability of polycarbonate compositions which have been impact modified and/or provided with flame-retardant properties by means of phosphorus-based flame retardants.

In the case of the use of oligomeric phosphate-based flame retardants, the amount thereof is correspondingly increased in favour of component A and is preferably in a range from 5 to 20 parts by weight.

EXAMPLES

Component A-1

Linear polycarbonate based on bisphenol A with a weight-average molecular weight Mw of 27,500 g/mol (determined by GPC in dichloromethane with polycarbonate as standard).

Component A-2

Linear polycarbonate based on bisphenol A with a weight-average molecular weight Mw of 30,500 g/mol (determined by GPC in dichloromethane with polycarbonate as standard).

Component B-1

Potassium perfluoro-1-butanesulfonate, available commercially as Bayowet® C4 from Lanxess, Leverkusen, Germany, CAS No. 29420-49-3.

Component B-2

Polytetrafluoroethylene (Blendex® B449 (about 50% PTFE and about 50% SAN [composed of 80% styrene and 20% acrylonitrile] from Chemtura).

Component C

Ethylene-propylene-octene-maleic anhydride copolymer (ethylene:propylene:octene 87:6:7), CAS No. 31069-12-2, with molecular weight Mw 5000 g/mol, density 940 kg/m$^3$, acid number 60 mg KOH/g, maleic anhydride content 4.4%, based on the copolymer C.

Component D-1

CS 7942, chopped short glass fibres (binding) from Lanxess AG having an average fibre diameter of 14 μm and an average fibre length of 4.5 mm.

Component D-2

CS108F-14P, chopped short glass fibres (not binding) from 3B having an average fibre diameter of 13.7 μm and an average fibre length of 4.0 mm.

Component D-3

MF 7980, ground glass fibres from Lanxess AG having an average fibre diameter of 14 μm and an average fibre length of 190 μm.

Component D-4

Quartz flour from Quarzwerke GmbH (50226 Frechen, Germany) was used, which is available under the trade name Sikron SF 600 (d50=3 μm, d95=10 μm, unsized).

Component E-1

Stearyl stearate, a lubricant/demoulding agent (Loxiol G32) from Emery Oleochemicals GmbH having a melting point of 54-58° C. and a saponification number of 108-114 mg KOH/g.

Component E-2

Pentaerythritol tetrastearate as lubricant/demoulding agent

Component F-1

Stabiliser Irgafos® 168 (tris-(2,4-di-tert-butyl-phenyl) phosphite).

The Charpy impact strength was determined according to ISO 179/1eU on test bars measuring 80*10*4 mm gated on one side.

The Charpy notched impact strength is measured according to ISO 179/1eA on test specimens of geometry 80*10*4 mm$^3$.

The Vicat B/120, as a measure of the heat distortion resistance, is determined according to ISO 306 on test specimens measuring 80*10*4 mm with a plunger load of 50 N and a heating rate of 120° C./h.

The mean particle size $d_{50}$ is the diameter above and below which in each case 50 wt. % of the particles lie.

The maximum particle size $d_{95}$ is the diameter below which 95 wt. % of the particles lie.

The corresponding diameters were determined by air separation.

The behaviour in fire is measured according to UL 94V on rods measuring 127×12.7×1.0 mm.

The modulus of elasticity and the strain at break were determined according to ISO 527 on a test bar measuring 80×10×4 mm gated on one side.

The melt-volume flow rate (MVR) is determined according to ISO 1133 (at 300° C.; 1.2 kg).

TABLE 1

| | Glass fibres I | | | | | | |
|---|---|---|---|---|---|---|---|
| | Example | | | | | | |
| | 1 | 2 | 3 | 4 | 5 | 6 | 7 |
| A-1 wt. % | 4.42 | 4.42 | 4.42 | 4.42 | 4.42 | 4.42 | 4.42 |
| A-2 wt. % | 85 | 84.995 | 84.99 | 84.95 | 84.9 | 84.995 | 84.99 |
| B-1 wt. % | 0.13 | 0.13 | 0.13 | 0.13 | 0.13 | 0.13 | 0.13 |
| C wt. % | | 0.005 | 0.01 | 0.05 | 0.1 | 0.005 | 0.01 |
| D-1 wt. % | 10 | 10 | 10 | 10 | 10 | | |
| D-2 wt. % | | | | | | 10 | 10 |
| D-3 wt. % | | | | | | | |
| E-1 wt. % | 0.45 | 0.45 | 0.45 | 0.45 | 0.45 | 0.45 | 0.45 |

TABLE 1-continued

Glass fibres I

| | | | | | | | |
|---|---|---|---|---|---|---|---|
| MVR [cm³/10 min] | 5.8 | 5.8 | 5.4 | 5.4 | 5.4 | 5.3 | 5.9 |
| VICAT | 147 | 146 | 150 | 145 | 144 | 145 | 145 |
| Charpy impact strength | 80 | 77 | 84 | 59 | 156 | 198 | 188 |
| Modulus of elasticity [N/mm²] | 3744 | 3734 | 3681 | 3813 | 3856 | 3744 | 3827 |
| Melt viscosity 300° C., 1000 s⁻¹ [pa s] | 411 | 400 | 441 | 423 | 430 | 450 | 420 |
| UL 94 V 1.5 mm rating | V0 | V0 | V0 | V0 | V0 | V0 | V0 |
| UL 94 V 1.5 mm total afterburn time [s] | 73 | 78 | 91 | 68 | 68 | 86 | 75 |

| | Example | | | | | | |
|---|---|---|---|---|---|---|---|
| | 8 | 9 | 10 | 11 | 12 | 13 | 14 |
| A-1 wt. % | 4.42 | 4.42 | 4.42 | 4.42 | 4.42 | 4.42 | 4.42 |
| A-2 wt. % | 84.95 | 84.9 | 84.995 | 84.99 | 84.95 | 84.9 | 84.5 |
| B-1 wt. % | 0.13 | 0.13 | 0.13 | 0.13 | 0.13 | 0.13 | 0.13 |
| C wt. % | 0.05 | 0.1 | 0.005 | 0.01 | 0.05 | 0.1 | 0.5 |
| D-1 wt. % | | | | | | | |
| D-2 wt. % | 10 | 10 | | | | | |
| D-3 wt. % | | | 10 | 10 | 10 | 10 | 10 |
| E-1 wt. % | 0.45 | 0.45 | 0.45 | 0.45 | 0.45 | 0.45 | 0.45 |
| MVR [cm³/10 min] | 4.9 | 4.9 | 5.9 | 6.1 | 6.0 | 6.0 | 6.3 |
| VICAT | 144 | 144 | 144 | 144 | 143 | 143 | 143 |
| Charpy impact strength | 214 | 210 | 223 | 237 | 236 | 238 | 271 |
| Modulus of elasticity [N/mm²] | 3906 | 3876 | 3038 | 3011 | 3015 | 3028 | 2907 |
| Melt viscosity 300° C., 1000 s⁻¹ [pa s] | 440 | 428 | 451 | 443 | 447 | 436 | 355 |
| UL 94 V 1.5 mm rating | V1 | V0 | V2 | V2 | V0 | V2 | V2 |
| UL 94 V 1.5 mm total afterburn time [s] | 97 | 80 | 76 | 67 | 70 | 68 | 112 |

TABLE 2

Glass fibres II

| | Example | | | | | | | | | | |
|---|---|---|---|---|---|---|---|---|---|---|---|
| | 15 | 16 | 17 | 18 | 19 | 20 | 21 | 22 | 23 | 24 | 25 |
| A-1 wt. % | 80 | 79.9 | 79.8 | 79.5 | 79 | 80 | 79.9 | 79.8 | 79.5 | 79 | 78 |
| A-2 wt. % | 9.42 | 9.42 | 9.42 | 9.42 | 9.42 | 9.42 | 9.42 | 9.42 | 9.42 | 9.42 | 9.42 |
| B-1 wt. % | 0.13 | 0.13 | 0.13 | 0.13 | 0.13 | 0.13 | 0.13 | 0.13 | 0.13 | 0.13 | 0.13 |
| C wt. % | | 0.1 | 0.2 | 0.5 | 1 | | 0.1 | 0.2 | 0.5 | 1 | 2 |
| D-1 wt. % | 10 | 10 | 10 | 10 | 10 | | | | | | |
| D-2 wt. % | | | | | | 10 | 10 | 10 | 10 | 10 | 10 |
| D-3 wt. % | | | | | | | | | | | |
| E-1 wt. % | 0.45 | 0.45 | 0.45 | 0.45 | 0.45 | 0.45 | 0.45 | 0.45 | 0.45 | 0.45 | 0.45 |
| MVR [cm³/10 min] | 6.8 | 6.3 | 6.4 | 5.3 | | 8.24 | 7.6 | 7.3 | 6.6 | 6.2 | 7.8 |
| VICAT [° C.] | 145 | 142 | 141 | 142 | 142 | 145 | 143 | 142 | 142 | 142 | 141 |
| Charpy impact strength [kJ/m²] | 131 | | | 213 | 205 | 73 | | | | 192 | 197 | 219 |
| Charpy notched impact strength [kJ/m²] | | 10.6 | 12.3 | | | | 9 | 10 | | | |
| Modulus of elasticity [N/mm²] | 4070 | 3994 | 3977 | 4430 | 4562 | 3670 | 3796 | 3843 | 3926 | 4118 | 4162 |
| Melt viscosity 300° C., 1000 s⁻¹ [pas] | 315 | 349 | 331 | 257 | 189 | 324 | 343 | 337 | 280 | 211 | 93 |

TABLE 3

Silicate filler

| | Example | | | | | | | | |
|---|---|---|---|---|---|---|---|---|---|
| | 26 | 27 | 28 | 29 | 30 | 31 | 32 | 33 | 34 |
| A-1 wt. % | 76.295 | 76.295 | 76.295 | 76.295 | 76.295 | 76.295 | 76.295 | 76.295 | 74.295 |
| A-2 wt. % | 3 | 2.895 | 2.89 | 2.85 | 2.8 | 2.7 | 2.4 | 1.9 | 2.9 |
| B-1 wt. % | 0.18 | 0.18 | 0.18 | 0.18 | 0.18 | 0.18 | 0.18 | 0.18 | 0.18 |

TABLE 3-continued

| | Silicate filler | | | | | | | | |
|---|---|---|---|---|---|---|---|---|---|
| | Example | | | | | | | | |
| | 26 | 27 | 28 | 29 | 30 | 31 | 32 | 33 | 34 |
| B-2 wt. % | 0.2 | 0.2 | 0.2 | 0.2 | 0.2 | 0.2 | 0.2 | 0.2 | 0.2 |
| C wt. % | | 0.005 | 0.01 | 0.05 | 0.1 | 0.2 | 0.5 | 1 | 2 |
| D-4 wt. % | 20 | 20 | 20 | 20 | 20 | 20 | 20 | 20 | 20 |
| E-2 wt. % | 0.35 | 0.35 | 0.35 | 0.35 | 0.35 | 0.35 | 0.35 | 0.35 | 0.35 |
| F-1 wt. % | 0.075 | 0.075 | 0.075 | 0.075 | 0.075 | 0.075 | 0.075 | 0.075 | 0.075 |
| MVR [cm$^3$/10 min]/6 min | 14.1 | 14.0 | 14.4 | 14.6 | 14.4 | 14.9 | 14.9 | 15.4 | 15.0 |
| VICAT [° C.] | 145 | 145 | 144 | 145 | 144 | 144 | 143 | 143 | 142 |
| Charpy impact [kJ/m$^2$] | 207 | 209 | 296 | 265 | 277 | 260 | 286 | | 270 |
| brittle (number) | 10 | 10 | 10 | 10 | 9 | 5 | 2 | | 3 |
| UL 94 (48 h) | 94V-0 | 94V-0 | 94V-0 | 94V-0 | 94V-0 | 94V-0 | 94V-0 | 94V-0 | n.d. |
| Afterburn time 48 h [s] | 39 | 42 | 35 | 47 | 30 | 36 | 37 | 42 | 141 |

The invention claimed is:

1. A flame-retardant, thermoplastic moulding composition comprising
   A) from 47.500 to 97.939 parts by weight of at least one aromatic polycarbonate,
   B) from 0.001 to 1.000 part by weight of at least one flame retardant,
   C) from 0.01 to 0.50 part by weight of at least one rubber-free anhydride-modified alpha-olefin terpolymer,
   D) from 2.0 to 40.0 parts by weight of at least one inorganic filler,
   E) from 0.05 to 1.00 part by weight of at least one demoulding agent,
   F) from 0.0 to 10.0 parts by weight of a further additive,
   wherein the sum of the parts by weight of components A) to F) is 100 parts by weight.

2. The moulding composition according to claim 1, wherein component D) is present in an amount of from 7.0 to 14.0 parts by weight.

3. The moulding composition according to claim 1, wherein component F) is present in an amount of from 1.0 to 6.0 parts by weight.

4. The moulding composition according to claim 1, wherein component C) is present in an amount of from 0.20 to 0.30 part by weight.

5. The moulding composition according to claim 1, wherein the anhydride is selected from the group consisting of maleic anhydride, phthalic anhydride, fumaric anhydride, itaconic anhydride, and mixtures thereof.

6. The moulding composition according to claim 5, wherein the anhydride is maleic anhydride.

7. The moulding composition according to claim 5, wherein the alpha-olefin terpolymer comprises structural units selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene, and mixtures thereof.

8. The moulding composition according to claim 5, wherein the rubber-free anhydride-modified terpolymer comprises
   C1) from 90.0 to 98.0 wt. % terpolymer and
   C2) from 2.0 to 10.0 wt. % anhydride.

9. The moulding composition according to claim 1, wherein the terpolymer comprises ethylene, 1-propene and 1-octene structural units.

10. The moulding composition according to claim 8, wherein the olefinic portion E1) of the anhydride-modified terpolymer is characterised in that
   the ethylene content is from 96.0 to 80.0 wt. %;
   the propylene content is from 2.0 to 10.0 wt. %; and
   the octene content is from 2.0 to 10.0 wt. %.

11. The moulding composition according to claim 1, wherein the rubber-free anhydride-modified terpolymer has a molecular weight Mw of from 2000 to 10,000 g/mol.

12. A method of preparing the polycarbonate composition of claim 1 comprising adding rubber-free anhydride-modified alpha-olefin terpolymers according to component C) for increasing the flowability of polycarbonate compositions.

13. The method according to claim 12, wherein the amount of component C for the compositions with improved flowability is from 0.5 to 10.0 parts by weight.

14. The method according to claim 12, wherein the rubber-free anhydride-modified alpha-olefin terpolymer is characterized in terms of its components and the amounts thereof by claim 5.

* * * * *